US008947395B2

(12) United States Patent
Chu

(10) Patent No.: US 8,947,395 B2
(45) Date of Patent: Feb. 3, 2015

(54) CONTROL CIRCUIT FOR SENSING CAPACITIVE CHANGES OF A TOUCH PANEL AND A METHOD THEREOF

(75) Inventor: Chun-Hsueh Chu, Hsinchu (TW)

(73) Assignee: TPK Touch Solutions Inc., Taipei (TW)

( * ) Notice: Subject to any disclaimer, the term of this patent is extended or adjusted under 35 U.S.C. 154(b) by 250 days.

(21) Appl. No.: 13/528,865

(22) Filed: Jun. 21, 2012

(65) Prior Publication Data

US 2013/0050140 A1 Feb. 28, 2013

(30) Foreign Application Priority Data

Aug. 31, 2011 (CN) .......................... 2011 1 0256450

(51) Int. Cl.
*G06F 3/045* (2006.01)
*G06F 3/041* (2006.01)
*G06F 3/044* (2006.01)

(52) U.S. Cl.
CPC .............. *G06F 3/0416* (2013.01); *G06F 3/044* (2013.01)
USPC ........................................ 345/174; 178/18.06

(58) Field of Classification Search
CPC ..... G06F 3/0416; G06F 3/044; G06F 3/0412; G06F 2203/04111; G06F 2203/04112
USPC .................. 178/18.01, 18.03, 18.06
See application file for complete search history.

(56) References Cited

U.S. PATENT DOCUMENTS

| 5,867,111 | A | 2/1999 | Caldwell et al. |
| 2008/0158179 | A1* | 7/2008 | Wilson ........................... 345/173 |
| 2010/0253647 | A1* | 10/2010 | Agari et al. ..................... 345/174 |
| 2011/0031042 | A1* | 2/2011 | Wu et al. ...................... 178/18.06 |
| 2012/0007829 | A1* | 1/2012 | Zhang et al. ................... 345/174 |

FOREIGN PATENT DOCUMENTS

CN 101419522 A 4/2009

* cited by examiner

*Primary Examiner* — Stephen Sherman
(74) *Attorney, Agent, or Firm* — Gokalp Bayramoglu

(57) ABSTRACT

The present invention relates to a control circuit and control method for detecting the capacitance of a touch panel. The control circuit comprises: a signal-detecting circuit for charging a sensing wire of the touch panel to obtain an intensity signal of the sensing wire; an intensity/frequency conversion unit for converting the intensity signal into a frequency signal, the frequency of which corresponds to the level of the intensity signal; and a frequency-analyzing unit for analyzing the frequency signal to obtain a signal amount of the corresponding sensing wire. The control circuit for the capacitive touch panel has a good SNR, which will not be affected or lowered by noise signals in the circuit environment, and is constituted of simple components to reduce the occupied area on the chip and lower the cost.

16 Claims, 7 Drawing Sheets

CONTROL CIRCUIT FOR SENSING CAPACITIVE CHANGES OF A TOUCH PANEL AND A METHOD THEREOF

This application claims the benefit of Chinese application No. 201110256450.3, filed on Aug. 31, 2011.

FIELD OF THE INVENTION

The present invention relates to a control circuit and control method for a touch panel, and more particularly, a control circuit and control method for detecting the capacitive change of a touch panel.

BACKGROUND OF THE INVENTION

The touch control technology used in touch panels can be classified into resistive type, capacitive type, surface acoustic wave type, and optics type, based on their sensing principles.

FIGS. 1 and 2 are a block diagram and a circuit diagram of a control circuit of a conventional capacitive touch panel, respectively. The control circuit 10 is electrically connected to the capacitive touch panel 12, and comprises a pulse generator 20, a multiplexer 22, a multiplexer 24, an integrator 26, a sampling and holding circuit 28, and an analog to digital converter (hereinafter called the ADC) 32.

The pulse generated by the pulse generator 20 functions as a driving which is transmitted through the multiplexer 22 to the X-axial driving wires and the Y-axial driving wires of the capacitive touch panel 12, and the value of capacitive change sensed by the Y-axial and X-axial sensing wires of the capacitive touch panel 12 functions as a touch control sensing signal, which is transmitted through the multiplexer 24 to the integrator 26.

In FIG. 2, the touch control sensing signal of the capacitive touch panel 12 transmitted through the multiplexer 24 to the integrator 26 is a pulse signal, and the integrator 26 integrates several pulse signals into a ladder-shaped wave signal and transmits it to a sampling and holding circuit 28.

Then, in FIG. 1, the sampling and holding circuit 28 samples the ladder-shaped wave signal. integrated by the integrator 26, and keeps the sampled signal at a direct current (DC) voltage level. The ADC 32 will convert the aforementioned sampled analog signal into a digital signal and transmit the digital signal to a microprocessor (not shown) to conduct a signal processing.

The aforementioned control circuit 10 used in the conventional capacitive touch panel 12, at least, has the following disadvantages:

There is noise signal generated in the circuit environment, and the noise signal will also be integrated by the integrator 26 as a portion of the signal, resulting in a low signal to noise ratio (SNR) of the whole system.

It takes a period of time for the integrator 26 to transfer and accumulate the charges on the capacitive touch panel 12 to a voltage that can be processed by a rear-end circuit. Such a long integration time will affect the frame rate of the capacitive touch panel 12. This problem may be compensated by way of a specific hardware (for example, the sampling and holding circuit 28); however, the cost will increase.

The use of the integrator 26, sampling and holding circuit 28, and digital to analog converter 32, will occupy a larger area on the chip.

SUMMARY OF THE INVENTION

The present invention provides a control circuit and control method for a touch panel, which can make the system have a good SNR and the control circuit not affected by noise signal generated in the environment to lower the SNR. Also, the control circuit is constituted of simple components to effectively reduce the occupied area on the chip and lower the cost of the whole system.

The present invention provides a control circuit for a touch panel, comprising:

a signal-detecting circuit for charging a sensing wire of the touch panel to obtain an intensity signal of the sensing wire;

an intensity/frequency conversion unit for converting the intensity signal into a frequency signal. the frequency of which corresponds to the level of the intensity signal; and a frequency-analyzing unit for analyzing the frequency signal to obtain a signal amount of the corresponding sensing wire.

In the control circuit according to the present invention, the sensing wire is a sensing wire of first axial direction or a sensing wire of second axial direction.

In the control circuit according to the present invention, the signal-detecting circuit is a capacitance-detecting circuit for providing a power source to charge an equivalent capacitor of the sensing wire, and correspondingly providing the power source having the same magnitude to charge an internal capacitor so as to obtain the intensity signal.

In the control circuit according to the present invention, the voltage Vout of the intensity signal generated by the capacitance-detecting circuit is expressed by the following formula:

$$V_{out} \approx \frac{L_a W_b}{W_a L_b} \frac{(V_{DD} - V_T)C_X}{C}$$

in which La is the gate length of a transistor a of the capacitance-detecting circuit, Wa is the gate width of the transistor a, Lb is the gate length of a transistor b of the capacitance-detecting circuit, Wb is the gate width of the transistor b, VDD is the supply voltage, VT is the critical voltage of the transistor, CX is the sum of the equivalent capacitance of the sensing wire and a stray capacitance of the circuit board of the control circuit, and C is the internal capacitance of the capacitance-detecting circuit.

In the control circuit according to the present invention, the capacitance-detecting circuit comprises:

a buffer stage circuit for stabilizing the intensity signal of the capacitance-detecting circuit; and a level shifter for adjusting and magnifying the level of the intensity signal of the capacitance-detecting circuit.

In the control circuit according to the present invention, the intensity/frequency conversion unit is a voltage-controlled oscillator, and the frequency-analyzing unit is a frequency counter or a frequency identifier.

The control circuit according to the present invention further comprises:

a first multiplexer, electrically connected with the signal-detecting circuit, for alternatingly selecting the sensing wire; and a second multiplexer, electrically connected with the signal-detecting circuit, for alternatingly selecting the intensity signal to transmit it to the intensity/frequency conversion unit.

The present invention also provides a method of controlling a touch panel, comprising the following steps of:

charging a sensing wire of the touch panel to obtain an intensity signal of the sensing wire;

converting the intensity signal into a frequency signal, wherein the frequency of the frequency signal is relative to the level of the intensity signal of the corresponding sensing wire; and analyzing the frequency signal to obtain a signal amount of the corresponding sensing wire.

In the method of controlling a touch panel according to the present invention, in the charging step, a power source is provided by a signal-detecting circuit to charge an equivalent capacitor of the sensing wire, and the power source, having the same magnitude, is correspondingly provided to charge an internal capacitor so as to obtain the intensity signal.

The method of controlling a touch panel according to the present invention further comprises:

alternatingly transmitting the power source for charging to the sensing wire; and alternatingly transmitting the intensity signal.

DESCRIPTION OF PREFERRED EMBODIMENTS

The control circuit for a touch panel according to the present invention comprises a signal-detecting circuit, an intensity/frequency conversion unit, a frequency-analyzing unit, and multiplexers.

The signal-detecting circuit is used to charge sensing wires of first axial direction and second axial direction on the touch panel, to obtain an intensity signal of each sensing wire. The intensity/frequency conversion unit converts the intensity signal into a frequency signal, the frequency of which corresponds to the level of the corresponding intensity signal. The frequency-analyzing unit analyzes the frequency signal to obtain a signal amount of the corresponding sensing wire, and transmits the signal amount to a microcontroller outside the control circuit. A first multiplexer is electrically connected with the signal-detecting circuit to alternatingly select the sensing wires. A second multiplexer is electrically connected with the signal-detecting circuit to alternatingly select the intensity signal, and transmit it to the intensity/frequency conversion unit.

The internal operation of the control circuit for a touch panel according. to the present invention is further described below with reference to the drawings.

Figure 1:
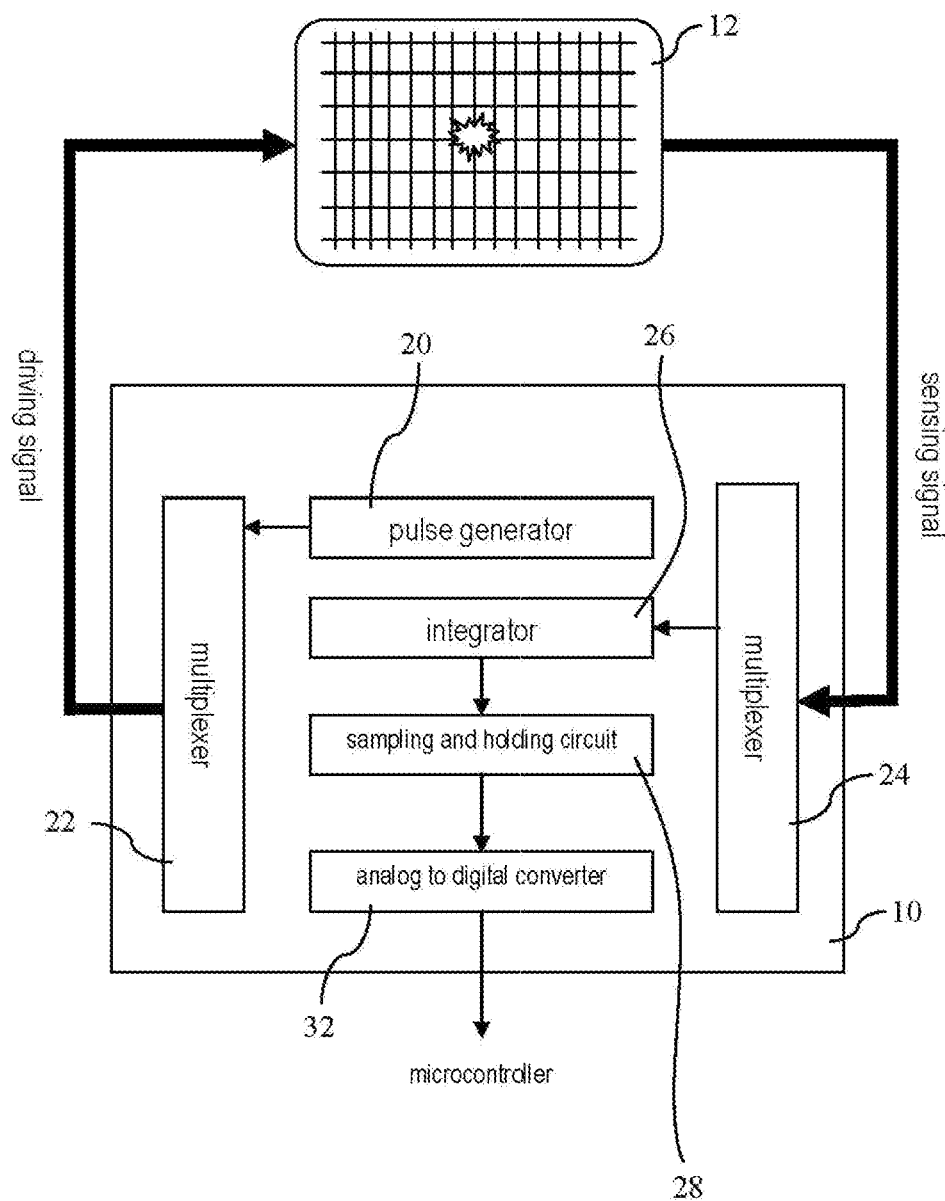
FIG. 1 is a block diagram of a control circuit of a conventional capacitive touch panel.
Figure 2:
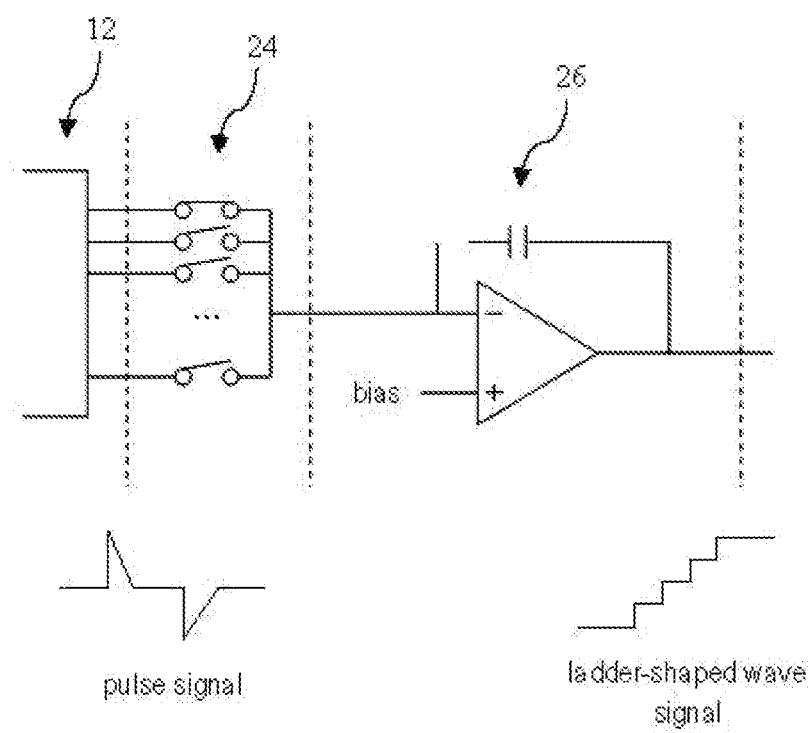
FIG. 2 is a circuit diagram of a control circuit of a conventional capacitive touch panel.
Figure 3:
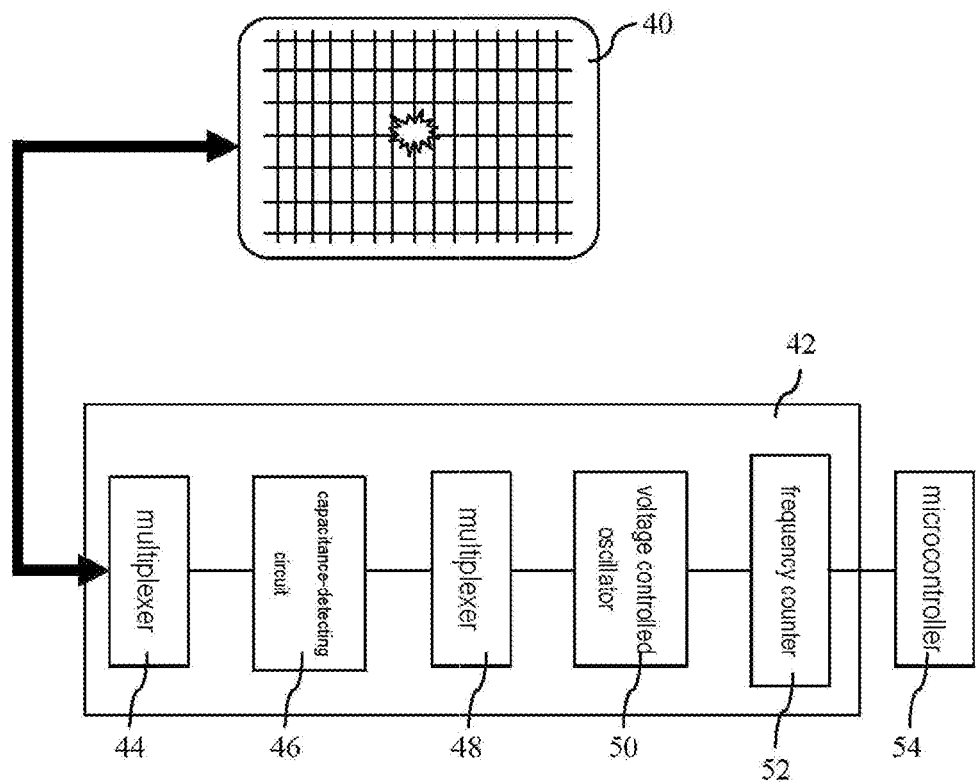
FIG. 3 is a block diagram of a system of capacitive touch panel according to the present invention.

FIG. 3 is a block diagram of a system of capacitive touch panel according to the present invention. In FIG. 3, the control circuit 42 comprises a multiplexer 44, a capacitance-detecting circuit 46 functioning as the aforementioned signal-detecting circuit, a multiplexer 48, a voltage controlled oscillator 50 functioning as the aforementioned intensity/frequency conversion unit, and a frequency counter 52 functioning as the aforementioned frequency-analyzing unit. The Multiplexers 44 and 48 can be a many-to-one switch or a plurality of one-to-one switches, and a frequency identifier can also be used as the frequency-analyzing unit.

Figure 4:
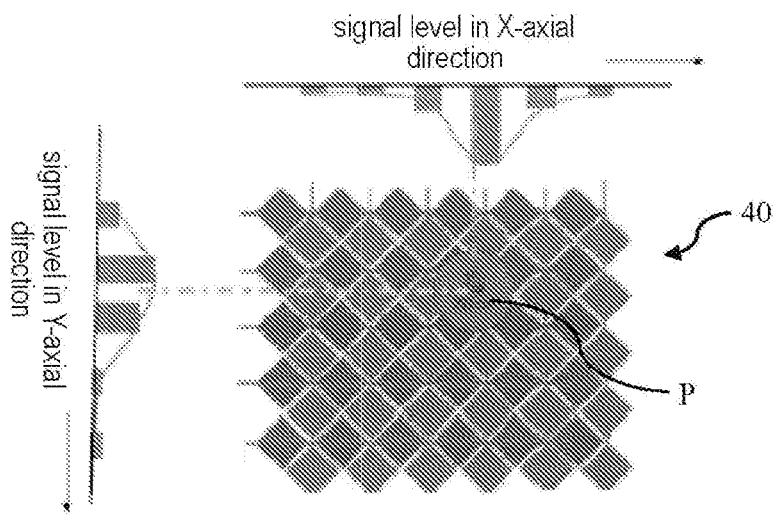
FIG. 4 is a schematic diagram showing the capacitive change sensed by the capacitive touch panel according to the present invention.

Also refer to FIG. 4. When a forger, or the like, touches a touch spot P of the capacitive touch panel 40, a capacitive change of the equivalent capacitor of the X-axial and Y'-axial sensing wires occurs at and around the touch spot P, and the coordinate position of the touch spot P can be calculated by the subsequent microcontroller 54 based on such a change. The capacitance of the equivalent capacitor sensed by the X-axial and Y'-axial sensing wires at the central position of the capacitive touch panel 40 is the largest, and the capacitance of the equivalent capacitor sensed by the X-axial and Y-axial sensing wires becomes smaller the further away from the central position it is.

The multiplexer 44 is electrically connected with every X-axial and Y'-axial sensing wires of the capacitive touch panel 40. The switching of the multiplexer 44 is controlled by the microcontroller 54 outside the control circuit 42, to transmit the capacitance of the equivalent capacitor sensed by every X-axial and Y-axial sensing wires of the capacitive touch panel 40 to the capacitance-detecting circuit 46 in sequence.

Figure 5:
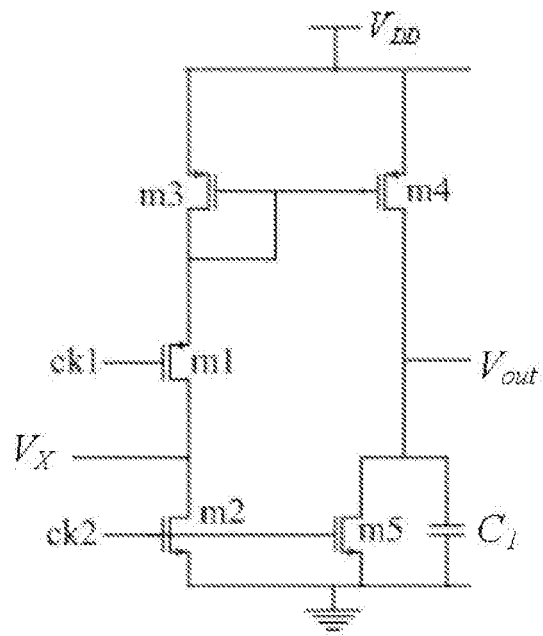
FIG. 5 is a circuit diagram of a capacitance-detecting circuit according to the present invention.

The capacitance-detecting circuit 46 supplies a charging power to the X-axial and Y-axial sensing wires through the multiplexer 44, and receives the capacitance of the equivalent capacitor sensed by every X-axial and Y-axial sensing wire. When charging either of the X-axial and Y-axial sensing wires, the capacitance-detecting circuit 46 will supply the same charging current to charge an internal capacitor based on the current charging the sensing wire, and the charged internal capacitor will form a voltage at both ends, which is the intensity signal, as shown in FIG. 5, which is a circuit diagram of a capacitance-detecting circuit according to the present invention, and FIG. 6, which is an equivalent circuit diagram of the capacitance-detecting circuit according to the present invention. The internal capacitor C1 in the capacitance-detecting circuit 46 can be a variable capacitor, by which the level of the intensity signal of the capacitance-detecting circuit 46 can be adjusted.

In FIG. 5, the transistor m3 and the transistor m4, for example, constitute a charging/discharging circuit of a current minor, a clock rate ck1 is inputted from the gate of the transistor m1, and a clock rate ck2 is inputted from the gates of the transistors m2 and m5. The clock rates ck1 and ck2 are each inputted by the microcontroller 54 into the gates of the transistors m1, m2. and m5. The clock rates ck1 and ck2 control the conduction and closing of the transistors m1, m2, and m5. The types of the transistors described in this embodiment are not restricted to the use of NMOS, PMOS, NPN BJT, or PNP BJT.

The operational principle of the capacitance-detecting circuit 46 includes two stages, namely, charging and discharging. When the clock rate ck1 is Low (low potential) and the clock rate ck2 is Low, which is the charging stage, the transistor m1 is conductive and the transistors nit and m5 are closed, and the supply voltage VDD will function as a charging current passing through the transistors m3 and m1 to be supplied to the sensing wires of the capacitive touch panel 40 through the multiplexer 44 from an input terminal (the connection between the transistors m1 and m2); namely, to charge the equivalent capacitor of the sensing wires (including the stray capacitor generated by the signaling path of the circuit board). Because the transistors m3 and m4 constitute a current mirror circuit, the current passing through the transistor m4 is the same as the current passing through the transistor m3, and will charge the internal capacitor C1, when the voltage generated by charging the internal capacitor C1 is the intensity signal obtained by the capacitance-detecting circuit 46, and the intensity signal is corresponding to the capacitance of the equivalent capacitor of the charged sensing wires. When the clock rate ck1 is High (high potential) and the clock rate ck2 is High, which is the discharging stage, the transistor m1 is closed and the transistors m2 and m5 are conductive. The current supplied to the sensing wires of the capacitive touch panel 40 is discharged by the transistor m2 to a around terminal from an input terminal through the multiplexer 44 and the charged internal capacitor C1 is discharged through the transistor m5 to a ground terminal.

Figure 6:
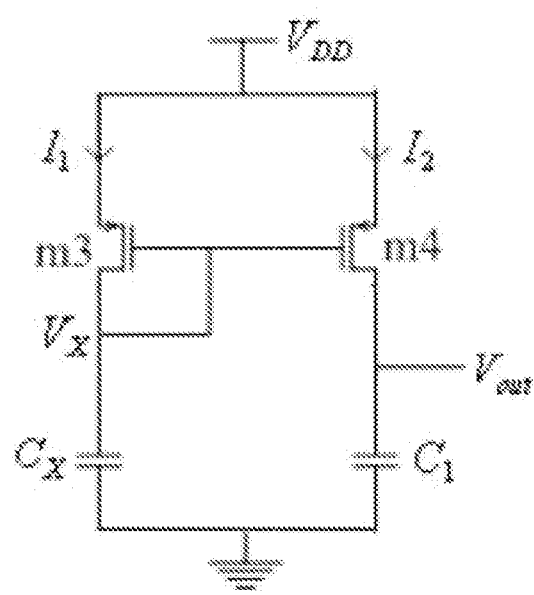
FIG. 6 is an equivalent circuit diagram of the capacitance-detecting circuit according to the present invention.

To facilitate deducing the formula, the capacitance-detecting circuit 46 of FIG. 5 is introduced in a simplified model with the equivalent circuit diagram of FIG. 6, in which the equivalent capacitor Cx is the equivalent capacitor of the sensing wires of the capacitive touch panel 40 (including the stray capacitor generated by the connecting wires of the circuit board).

The deduced result according to the equivalent circuit of FIG. 6 is as below:

$$I_1 = \frac{1}{2}\mu_0 C_{OX} \frac{W}{L}(V_{GS} - V_T)^2$$

in which μ0 is the electronic mobility of the transistor, COX is the ratio of the dielectric constant to the thickness of the oxide of the transistor, W is the gate width of the transistor, L is the gate length of the transistor, VGS is the voltage difference between the gate and the source of the transistor, and VT is the critical voltage of the transistor.

After the current I1 charges the equivalent capacitor Cx of the sensing wires of the capacitive touch panel 40 for a period of time t, the voltage difference Vx generated at the input terminal of the capacitance-detecting circuit 46 is:

$$V_x = \int_o^t I_1 \, dT$$

The voltage Vout at the output terminal can be deduced as below according to the circuit configuration of the capacitance-detecting circuit 46 and the characteristic of the transistor:

$$V_{out} = \frac{L_3 W_4}{W_3 L_4}\frac{(V_{DD} - V_T)}{C_1}\left[1 - \frac{1}{1 + \frac{1}{C_x}\left(\frac{\mu_0 C_{OX} W_3}{2L_3}\right)(V_{DD} - V_T)_1}\right]C_X \approx$$

$$\frac{L_a W_b}{W_a L_b}\frac{(V_{DD} - V_T)}{C_1}C_X$$

in which Vout is the voltage at the output terminal of the capacitance-detecting circuit 46, L3 is the gate length of the transistor m3, W3 is the gate width of the transistor m3, L4 is the gate length of the transistor m4, and W4 is the gate width of the transistor m4.

Figure 7:
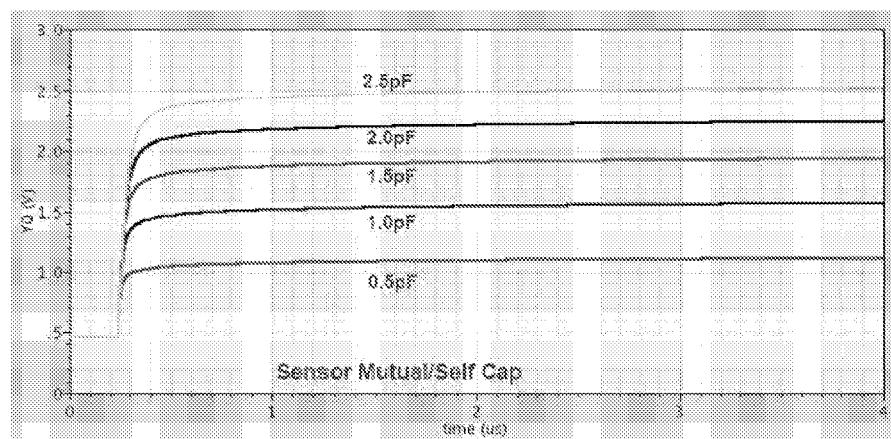
FIG. 7 is a diagram showing the relation between the voltage Vout at the output terminal of the capacitance-detecting circuit and the capacitance Cx of the sensing wires of the capacitive touch panel according to the present invention.

Therefore, the voltage Vout at the output terminal of the capacitance-detecting circuit 46 is in proportion to Cx/C1, as shown in FIG. 7, which is a diagram showing the relation between the voltage Vout at the output terminal of the capacitance-detecting circuit and the equivalent capacitance Cx of the sensing wires of the capacitive Touch panel according to the present invention.

In FIG. 7, it can be found that the capacitance of the equivalent capacitor Cx sensed by the sensing wires at the location where the finger touches the capacitive touch panel 40 is larger (for example, the maximum capacitance of the equivalent capacitor Cx shown in FIG. 7 is 2.5 pF). Therefore, the voltage Vout (namely, the intensity signal) obtained after the capacitance-detecting circuit 46 detects the capacitance, is relatively larger. Also, the capacitance of the equivalent capacitor Cx, sensed by the sensing wires, gradually becomes small as it is further from the location where the finger touches the capacitive touch panel 40 (for example, the capacitance of the equivalent capacitor Cx shown in FIG. 7 gradually becomes small as it is away from the location where the finger touches the capacitive touch panel 40 and is 2.0 pF, 1.5 pF, 1.0 pF, and 0.5 pF in sequence). Therefore, the voltage Vout obtained after the capacitance-detecting circuit 46 detects the capacitance becomes smaller and smaller as the capacitance of the equivalent capacitor Cx gradually becomes smaller.

Figure 8:
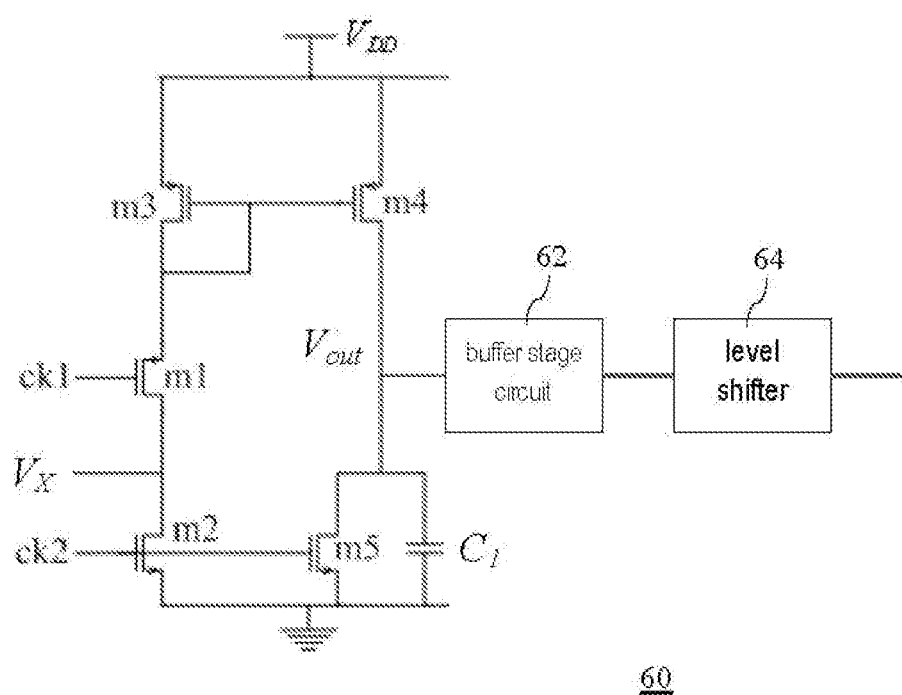
FIG. 8 is a circuit diagram of another capacitance-detecting circuit according to the present invention.

To make the capacitance-detecting circuit have a better circuit characteristic, as shown in FIG. 8 which is a circuit diagram of another capacitance-detecting circuit according to the present invention, there is a buffer stage circuit (including, for example, a buffer and a source follower) 62 coupled to the location where the transistor m4 and transistor m5 of the capacitance-detecting circuit 60 are connected, which is used for stabilizing the output voltage Vout of the capacitance-detecting circuit 60 to not be affected by other loading effects, such as a rear-end voltage controlled oscillator (WO) 50 (as shown in FIG. 3). The buffer stage circuit 62 is coupled with a level shifter 64, and the level shifter 64 can further comprise, for example, a programmable gain amplifier for adjusting and amplifying the level of the output voltage Vout of the capacitance-detecting circuit 60, and transmitting the adjusted and amplified output voltage Vout to a rear-end circuit, such as the voltage controlled oscillator 50.

The capacitance-detecting circuit 46 in FIG. 5, is a circuit constituted of several NMOS's, PMOS's, NPNBJT's, or PNPBJT's. In comparison with the conventional capacitance-detecting circuit 10 which is a large circuit constituted of the pulse generator 20, the integrator 26 and the sampling and holding circuit 28, the capacitance-detecting circuit 46 of this embodiment is low in cost, small in occupied chip area, excellent in performance, and can support a low supply voltage (for example, 3V-1.8V).

In FIG. 3, the multiplexer 48 is electrically connected to the output terminal of the capacitance-detecting circuit 46, and the switching of the multiplexer 48 is controlled by the microcontroller 54 to transmit the voltage Vout (namely, the intensity signal) at the output terminal of the capacitance-detecting circuit 46 to the voltage controlled oscillator 50.

The voltage controlled oscillator 50 is an electron oscillating circuit of which the oscillating frequency is controlled by making use of input voltages. In other words, the higher the voltage inputted into the voltage controlled oscillator 50. the higher the output frequency generated by the voltage controlled oscillator 50.

The voltage Vout which is a direct current voltage, at the output terminal of the capacitance-detecting circuit 46 is inputted into the voltage controlled oscillator 50 through the multiplexer 48. The capacitance of the equivalent capacitor Cx sensed by the sensing wires at the location where the finger touches the capacitive touch panel 40, is larger, and the voltage Vout obtained after the capacitance-detecting circuit 46 detects the capacitance, is relatively larger. Therefore, due to a larger voltage Vout . the voltage controlled oscillator 50 generates a higher output frequency. On the other hand, the capacitance of the equivalent capacitor Cx sensed by the sensing wires in the vicinity of the location where the finger touches the capacitive touch panel 40, is smaller, and the voltage Vout obtained after the capacitance-detecting circuit 46 detects the capacitance, is relatively smaller. Therefore, due to a smaller voltage Vout, the voltage controlled oscillator 50 generates a lower output frequency.

The voltage controlled oscillator 50 inputs the generated output frequency into the frequency counter 52 (or the frequency identifier), and the frequency counter 52 (or the frequency identifier) counts the output frequency inputted by the voltage controlled oscillator 50 and obtains a counting value, which is the signal amount of the capacitance of the equivalent capacitor Cx sensed by the corresponding sensing wires.

As the microcontroller 54 controls the multiplexer 44 to transmit the capacitance of the equivalent capacitor Cx sensed by certain sensing wires of the capacitive touch panel 40 to the capacitance-detecting circuit 46, the frequency counter 52 (or the frequency identifier) receives the output frequency generated by the voltage controlled oscillator 50, which output frequency corresponds to the capacitance of the equivalent capacitor Cx sensed by the certain sensing wires. As shown in FIG. 4, the capacitance of the equivalent capacitor sensed by the X-axial and Y-axial sensing wires at the location where the finger touches the capacitive touch panel 40 is larger, and thus the counting value counted by the frequency counter 52 (or the frequency identifier) that corresponds to the X-axial and Y-axial sensing wires at the location where the finger touches the capacitive touch panel 40 is higher. While on the other hand, the capacitance of the equivalent capacitor sensed by the X-axial and Y-axial sensing wires in the vicinity of the location where the finger touches the capacitive touch panel 40 is smaller, and thus the counting value counted by the frequency counter 52 (or the frequency identifier) that corresponds to the X-axial and Y-axial sensing wires in the vicinity of the location where the finger touches the capacitive touch panel 40 is lower. Therefore, the microcontroller 54 compares the capacitance of the equivalent capacitor of the X-axial and Y-axial sensing wires with each other, based on the counting values received from the frequency counter 52 (or the frequency identifier), and after the comparison, the microcontroller 54 obtains that the capacitance of the equivalent capacitor of at least one X-axial sensing wire and one Y-axial sensing wire is higher than the capacitances of the equivalent capacitors of other X-axial and Y-axial sensing wires so that the location where the finger touches the capacitive touch panel 40 can be determined.

The control circuit 42 according to this embodiment has the following advantages:

When the supply voltage to the capacitive touch panel 40 gets lower and lower (5V, 3V, 1.8V, 1.2V), the voltage controlled oscillator 50 can still generate a high frequency signal on the condition of low supply voltage, so that the SNR of the control circuit 42 operating at the high frequency signal is difficult to be affected by the low supply voltage and be lowered.

The noise signal generated in the circuit environment will not lower the SNR of the control circuit 42, because the voltage controlled oscillator 50 can operate at a signal of higher frequency (for example, a range of MHz-GHz), and the oscillating frequency outputted by the voltage controlled oscillator 50 will not be affected by the noise signal in the environment.

The capacitance of the equivalent capacitor sensed by the finger touching the capacitive touch panel 40 will result in a wide change range of the oscillating frequency generated by the voltage controlled oscillator 50, and thus makes it difficult to be affected by the noise signal in the environment, so that the control circuit 42 has a hid SNR.

Figure 9:
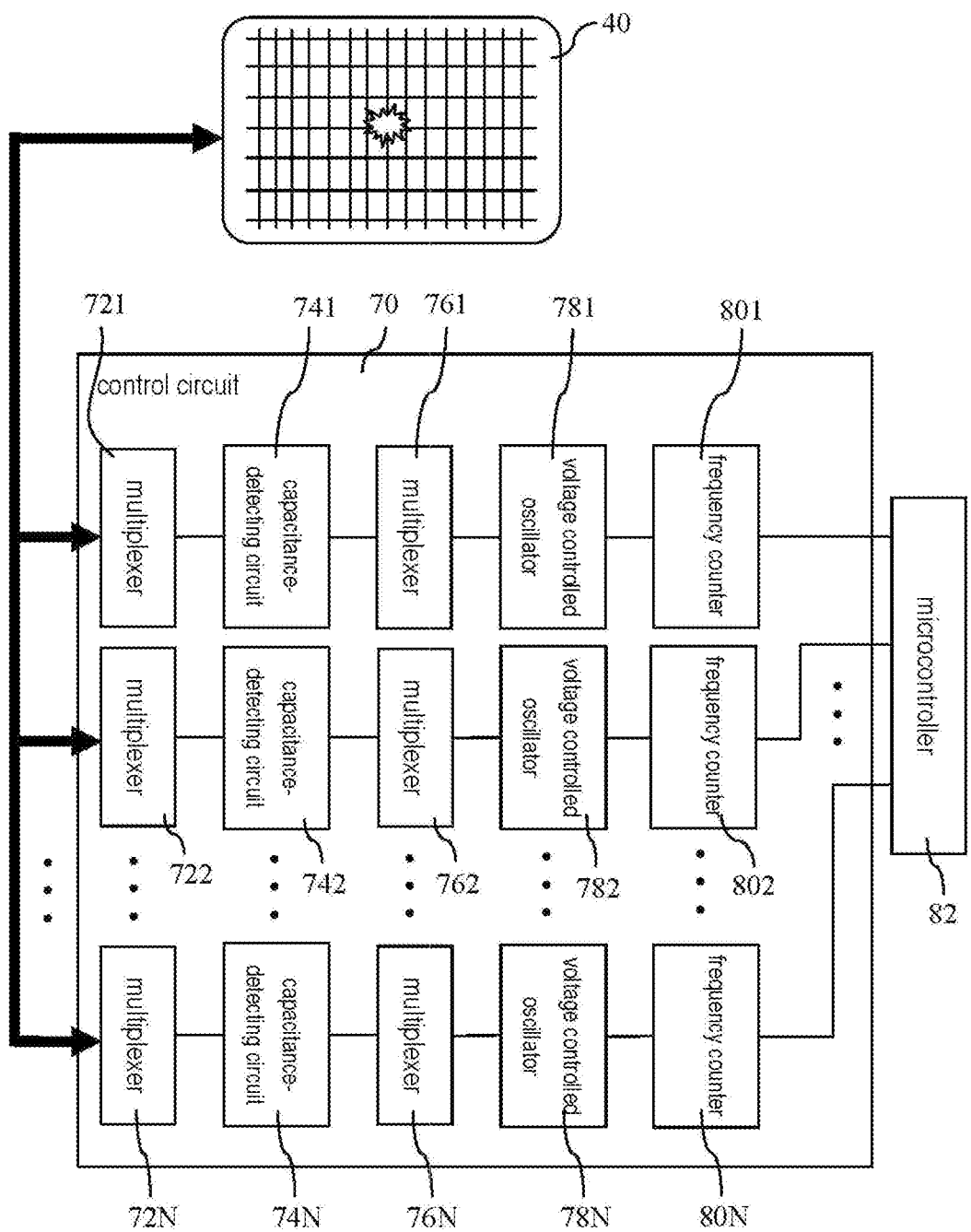
FIG. 9 is a block diagram of another system of capacitive touch panel according'to the present invention.

FIG. 9 is a block diagram of another system of capacitive, touch panel according to the present invention. The capacitive touch panel of FIG. 9 has the same function and configuration as the capacitive touch panel 40 of FIG. 3, and thus the same reference numerals are used and their descriptions are omitted. In FIG. 9, the control circuit 70 comprises multiplexers 721, 722, . . . 72N, capacitance-detecting circuits 741, 742, . . . 74N, multiplexers 761, 762, . . . 76N, voltage controlled oscillators 781, 782, . . . 78N, and frequency counters 801, 802, . . . 80N (the frequency identifier can also be used). The multiplexer 721, capacitance-detecting circuit 741, multiplexer 761, voltage controlled oscillator 781, and frequency counter 801, are substantially the same as the components of the control circuit 42 of FIG. 3 and have the same functions; the multiplexer 722, capacitance-detecting circuit 742, multiplexer 762, voltage controlled oscillator 782, and frequency counter 802 are substantially the same as the components of the control circuit 42 of FIG. 3 and have the same functions; and so on. Also, N is an integer lager than, or equal to 2, and can be appropriately determined in consideration of the processing time of the whole system as to the finger touching the capacitive touch panel 40.

Each of the multiplexers 721, 722, . . . 72N is electrically connected in parallel to the X-axial and Y-axial sensing wires of the capacitive touch panel 40, and the switching of the multiplexers 721, 722, . . . 72N is controlled by the microcontroller 82 outside the control circuit 70 to simultaneously transmit the capacitances of the equivalent capacitors sensed by the X-axial and Y-axial sensing wires of the capacitive touch panel 40 to the capacitance-detecting circuits 741, 742, . . . 74N to generate the intensity signals corresponding to the capacitances of the equivalent capacitors of the X-axial and Y-axial sensing wires. The voltage controlled oscillators 781, 782, . . . 78N each generate an output frequency based on the intensity signals and synchronously input them into the frequency counters 801, 802, . . . 80N (or the frequency identifier). The frequency counters 801, 802, . . . 80N each generate a counting value based on the output frequencies and synchronously input them into the microcontroller 82. The microcontroller 82 compares these counting values to determine the location where the finger touches the capacitive touch panel 40.

A large-size capacitive touch panel 40 has a higher amount of X-axial and Y-axial sensing wires. If the control circuit 42, having the circuit configuration of FIG. 3, is used to respond to the finger touching the large-size capacitive touch panel 40, it will inevitably take a long response time. If the control circuit 70 of FIG. 9, having multiple sets of the same components, is used to synchronously process the response to the finger touching the large-size capacitive touch panel 40, the response time can be shortened greatly.

In another embodiment, in order to avoid occupying too much space of the capacitive touch panel 40 due to too many circuit components, N multiplexers 761. 762, . . . 76N, N voltage controlled oscillators 781, 782, ... 78N, and N frequency counters 801, 802, ... 80N can be replaced with one multiplexer, one voltage controlled oscillator, and one frequency counter (or one frequency identifier). The multiprocessing is conducted by N capacitance-detecting circuits 741, 742, ... 74N collocating with the N multiplexers 721, 722, ... 72N, said one multiplexer and said one voltage controlled oscillator conduct a time-sharing processing (a time-sharing signal can be generated by the microcontroller 82 to control the N multiplexers 721, 722, ... 72N) on the intensity signal outputted by the capacitance-detecting circuit 74x, and said one frequency counter (or said one frequency identifier) processes the output frequency of said one voltage controlled oscillator, and transmits the counting value to the microcontroller 82.

The control circuit and control method for a touch panel according to the present invention is advantageous in that the control circuit has a good SNR and is not affected by noise signal generated in the environment to lower the SNR; also, the control circuit is constituted of simple components to effectively reduce the occupied area on the chip, and lower the cost of the whole system.

While the present invention has been described above with reference to the preferred embodiments and illustrative drawings, it should not be considered as limited thereby. Various equivalent alterations, omissions, and modifications made to its configuration and the embodiments by the skilled persons could be conceived of without departing from the claimed scope of the present invention.

LIST OF REFERENCE NUMERALS 10 control circuit
12 capacitive touch panel
20 pulse generator
22 multiplexer
26 integrator
28 sampling and holding circuit
32 analog to digital converter
40 capacitive touch panel
42 control circuit
44 multiplexer
46 capacitance-detecting circuit
48 multiplexer
50 voltage controlled oscillator
52 frequency counter
54 microcontroller
60 capacitance-detecting circuit
62 buffer stage circuit
64 level shifter
70 control circuit
82 microcontroller
721 multiplexer
722 multiplexer
72N multiplexer
741 capacitance-detecting circuit
742 capacitance-detecting circuit
74N capacitance-detecting circuit
761 multiplexer
762 multiplexer
76N multiplexer
781 voltage controlled oscillator
782 voltage controlled oscillator
78N voltage controlled oscillator
801 frequency counter
802 frequency counter
80 N frequency counter

What is claimed is:

1. A control circuit for a touch panel, comprising:
a signal-detecting circuit for charging a sensing wire of the touch panel to obtain an intensity signal of the sensing wire, wherein the signal-detecting circuit is a capacitance-detecting circuit for providing a power source to charge an equivalent capacitor of the sensing wire, and correspondingly providing the power source having the same magnitude to charge an internal capacitor of the capacitance-detecting circuit so as to obtain the intensity signal,
wherein the voltage $V_{out}$ of the intensity signal generated by the capacitance-detecting circuit is expressed by the following formula:

$$V_{out} \approx \frac{L_a W_b}{W_a L_b} \frac{(V_{DD} - V_T)C_X}{C}$$

in which $L_a$ is the gate length of a transistor a of the capacitance-detecting circuit, $W_a$ is the ate width of the transistor a, $L_b$ is the gate length of a transistor b of the capacitance-detecting circuit, $W_b$ is the gate width of the transistor b, $V_{DD}$ is the supply voltage. $V_T$ is the critical voltage of the transistor b, $C_x$ is the sum of the equivalent capacitance of the sensing wire and a stray capacitance of the circuit board of the control circuit, and C is the internal capacitance of the capacitance-detecting circuit;
an intensity/frequency conversion unit for converting the intensity signal into a frequency signal, the frequency of which corresponds to the level of the intensity signal; and
a frequency-analyzing unit for analyzing the frequency signal to obtain a signal amount of the corresponding sensing wire.

2. The control circuit according to claim 1, wherein the sensing wire is a sensing wire of first axial direction or a sensing wire of second axial direction.

3. The control circuit according to claim 1, wherein the capacitance-detecting circuit comprises:
buffer stage circuit for stabilizing the intensity signal of the capacitance-detecting circuit; and
a level shifter for adjusting and magnifying the level of the intensity signal of the capacitance-detecting circuit.

4. The control circuit according to claim 3, wherein the buffer stage circuit comprises a buffer and a source follower.

5. The control circuit according to claim 3, wherein the level shifter is coupled with the buffer stage circuit and comprises a programmable gain amplifier.

6. The control circuit according to claim 1, wherein the intensity/frequency conversion unit is a voltage controlled oscillator, and the frequency-analyzing unit is a frequency counter or a frequency identifier.

7. The control circuit according to claim 1, further comprising:
a first multiplexer, electrically connected with the signal-detecting circuit, for alternatingly selecting the sensing wire; and
a second multiplexer, electrically connected with the signal-detecting circuit, for alternatingly selecting the intensity signal to transmit it to the intensity/frequency conversion unit.

8. The control circuit according to claim 1, wherein the internal capacitor of the capacitance-detecting circuit is a variable capacitor.

9. The control circuit according to claim 1, wherein the capacitance-detecting circuit comprises a charging/discharging circuit of a current mirror.

10. The control circuit according to claim 1, wherein the capacitance-detecting circuit comprises a plurality of NMOSs, PMOSs, NPNBJTs, or PNPBJTs.

11. A method of controlling a touch panel, comprising the following steps of:

charging a sensing wire of the touch panel to obtain an intensity signal of the sensing wire, wherein a capacitance-detecting circuit provides a power source for charging an equivalent capacitor of the sensing wire, and correspondingly provides the power source having the same magnitude for charging an internal capacitor of the capacitance-detecting circuit so as to obtain the intensity signal, wherein the voltage $V_{out}$ of the intensity signal generated by the capacitance-detecting circuit is expressed by the following formula:

$$V_{out} \approx \frac{L_a W_b}{W_a L_b} \frac{(V_{DD} - V_T) C_X}{C}$$

in which $L_a$ is the gate length of a transistor a of the capacitance-detecting circuit, $W_a$ is the gate width of the transistor a, $L_b$ is the gate length of a transistor b of the capacitance-detecting circuit, $W_b$ is the gate width of the transistor b, $V_{DD}$ is the supply voltage, $V_T$ is the critical voltage of the transistor b, $C_X$ is the sum of the equivalent capacitance of the sensing wire and a stray capacitance of the circuit board of the control circuit, and C is the internal capacitance of the capacitance-detecting circuit;

converting the intensity signal into a frequency signal, wherein the frequency of the frequency signal is relative to the level of the intensity signal of the corresponding sensing wire; and analyzing the frequency signal to obtain a signal amount of the corresponding sensing wire.

12. The method according to claim 11, further comprising:
alternatingly transmitting the power source for charging to the sensing wire; and
alternatingly transmitting the intensity signal.

13. The method according to claim 11, wherein the internal capacitor of the capacitance-detecting circuit is a variable capacitor.

14. The method, according to claim 11, wherein the capacitance-detecting circuit comprises a charging/discharging circuit of a current mirror.

15. The method according to claim 11, wherein the capacitance-detecting circuit comprises a plurality of NMOSs, PMOSs, NPNBJTs, or PNPBJTs.

16. The method according to claim 11, further comprising:
stabilizing the intensity signal of the capacitance-detecting circuit; and
adjusting and magnifying the level of the intensity signal of the capacitance-detecting circuit.

* * * * *